(No Model.)

G. W. FARRELL.
VEHICLE RUNNING GEAR.

No. 452,915. Patented May 26, 1891.

Witnesses
C. C. Burdine.
J. R. Davis.

Inventor
George W. Farrell
per R. G. Du Bois.
His Attorney.

UNITED STATES PATENT OFFICE.

GEORGE W. FARRELL, OF AU SABLE FORKS, NEW YORK.

VEHICLE RUNNING-GEAR.

SPECIFICATION forming part of Letters Patent No. 452,915, dated May 26, 1891.

Application filed May 2, 1890. Serial No. 350,295. (No model.)

*To all whom it may concern:*

Be it known that I, GEORGE W. FARRELL, a citizen of the United States, residing at Au Sable Forks, in the county of Essex and State of New York, have invented certain new and useful Improvements in Vehicle Running-Gear; and I do hereby declare the following to be a full, clear, and exact description of the invention, such as will enable others skilled in the art to which it appertains to make and use the same.

My invention relates to those carriages, buggies, and wagons in which the customary reach is dispensed with and a more simple and cheap device substituted, my object being to improve upon the construction as described in my prior patent, No. 417,480, and dated December 17, 1889. With this purpose in contemplation my device comprises the peculiarities and combinations of parts more fully described hereinafter, and pointed out in the claim.

Figure 1:
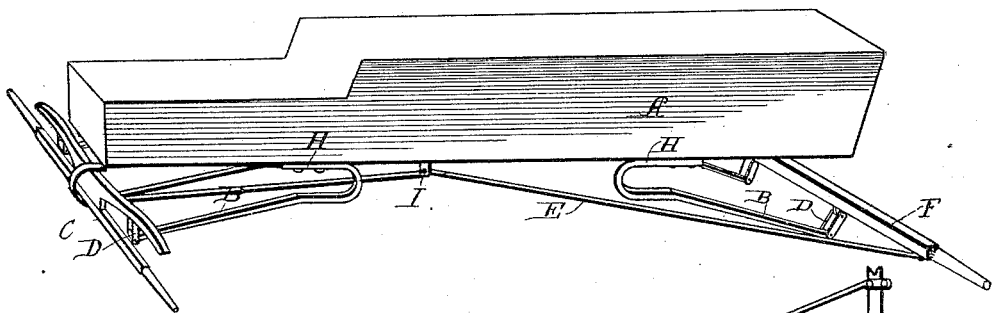
Figure 2:
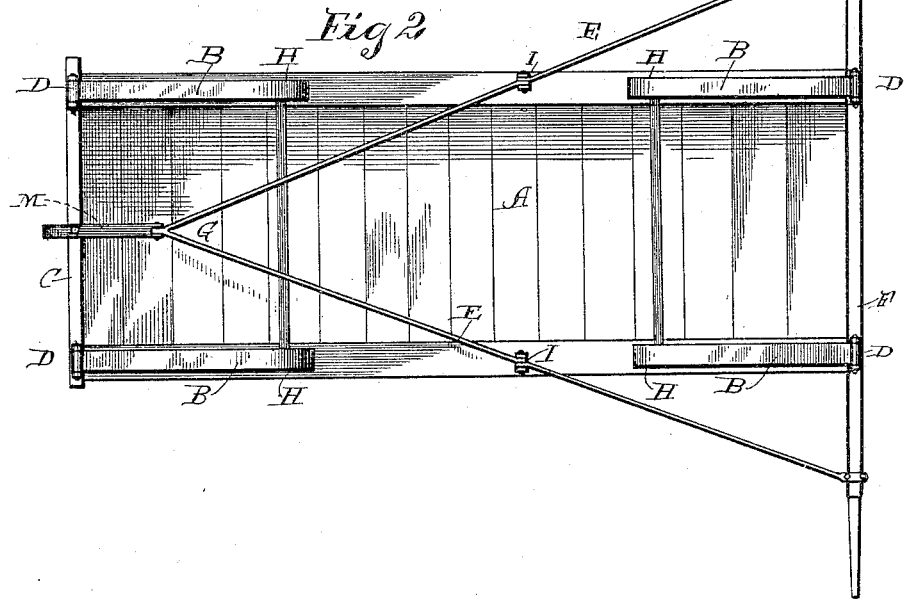

In the accompanying drawings, Figure 1 represents a side view of my improvement, and Fig. 2 a bottom view of the buggy to which it is applied.

A represents the body of a buggy, wagon, or similar vehicle, which is supported upon side springs B, each of which has one end H rigidly secured to the vehicle-body and the other to the axles C F. The end secured to the axle is suspended therefrom by shackles D, which permit it to oscillate in response to the rising and falling motion of the body A.

In place of the usual reach I provide a pair of brace-rods E, which are rigidly bolted at their rear ends to the rear axle F and, converging as they extend forward, are joined together at a point G, below the center of the front axle, where they are pivotally secured to the fifth-wheel attachment M. Midway between the front and rear axles the rods E are provided with toggle joints or hinges I, secured to the underside of the body A, thereby providing a regular equalized gear, in which all the parts co-operate in response to the movement of the vehicle. By this arrangement I am able to dispense with the four joints used in my former patent and to substitute therefor only two joints, thereby greatly simplifying the structure and rendering it much stronger and less liable to get out of order.

I have shown my improvement in combination with four separate springs.

It will be seen that as the body A rises and falls it carries with it the toggle-joined ends H of the brace-bars, thereby causing the outer ends of said bars to spread farther apart and draw nearer together in unison with the outer ends of the springs, thus making all the parts co-operate in perfect harmony.

It is evident that my invention could be varied in many slight ways which might suggest themselves to a skillful mechanic. Therefore I do not limit myself to the precise construction shown, but consider myself entitled to all such variations as come within its scope.

Having thus described my device, what I claim as new, and desire to secure by Letters Patent, is—

The combination, with a vehicle-body, of a pair of separate side springs located at the front and rear of the body and each having one end curved upwardly and rigidly secured to the vehicle-body and the other end shackle-joined to the front and rear of the running-gear, a pair of brace-rods having one end rigidly secured to the rear axle and their opposite conjoined ends secured to the front axle, each of said rods being hinged at or near the middle and attached to the vehicle-body at or near its central portion, all arranged and adapted to operate as set forth.

In testimony whereof I affix my signature in presence of two witnesses.

GEORGE W. FARRELL.

Witnesses:
J. A. SMITH,
LOUIS F. ROBARE.